United States Patent [19]

Weathers et al.

[11] Patent Number: 4,580,139

[45] Date of Patent: Apr. 1, 1986

[54] WAVEFORM DESIGN FOR OPTIMIZED AMBIGUITY RESPONSE

[75] Inventors: Glenn D. Weathers; Edward M. Holliday; Augustus H. Green, Jr., all of Huntsville, Ala.

[73] Assignee: The United States of America as represented by the Secretary of the Army, Washington, D.C.

[21] Appl. No.: 506,934

[22] Filed: Jun. 22, 1983

[51] Int. Cl.[4] ............................................. G01S 7/30
[52] U.S. Cl. ............................................. 343/17.1 R
[58] Field of Search ........... 343/17.1 R, 5 VQ, 5 DP, 343/5 SW, 378

[56] References Cited

U.S. PATENT DOCUMENTS

| | | | |
|---|---|---|---|
| 4,025,919 | 5/1977 | Jefferies et al. | 343/5 VQ |
| 4,042,925 | 8/1977 | Albanese et al. | 343/14 |
| 4,430,655 | 2/1984 | Rittenbach | 343/5 SW X |

*Primary Examiner*—Nelson Moskowitz
*Assistant Examiner*—John B. Sotomayor
*Attorney, Agent, or Firm*—Anthony T. Lane; Robert P. Gibson; Robert C. Sims

[57] ABSTRACT

This is a method of waveform design and range correlator implementation that uses weighting to optimize a radar receiver's ambiguity response in both the temporal and frequency dimensions of the ambiguity function. It is an extension of group-complementary code structure and is based on a multipulse processing technique.

The procedure minimizes frequency sidelobes over a selected interval in the spectral domain between dc and the pulse repetition frequency and completely eliminates temporal sidelobes throughout the pulse repetition interval. It minimizes clutter and multitarget interference in an active-sensor target acquisition and tracking application, and still allows weighting of the pulse responses to reduce frequency domain sidelobes.

4 Claims, 2 Drawing Figures

WAVEFORM DESIGN FOR OPTIMIZED AMBIGUITY RESPONSE

DEDICATORY CLAUSE

The invention described herein may be manufactured, used, and licensed by or for the Government for governmental purposes without the payment to us of any royalties thereon.

BACKGROUND OF THE INVENTION

A copending invention disclosure, "Group-Complementary Code Sets for Implementing Pulse-Compression Processing with Optimized Aperiodic Autocorrelation and Optimized Cross-Correlation Properties" Ser. No. 362,934, described a waveform structure, called group-complementary codes, which occurs in orthogonal groups and provides zero temporal sidelobes over the pulse repetition interval. This invention disclosure describes a different correlator and waveform structure that is an extension of the group-complementary coding technique, and which not only provides the optimized autocorrelation properties of group-complementary codes but also allows optimization of the spectral-sidelobe response in the frequency domain.

Group-complementary coding is a process that utilizes the individual responses of K pulses in an active sensor system to form a composite response, with the property that the autocorrelation function will have zero temporal sidelobes over the pulse unambiguous interval. In forming the composite response, the responses of the individual pulses are algebraically added, with the same weight given to each pulse. In many sensor applications, filter formation for the purpose of spectral analysis follows a pulse-compression processor. In such applications, a number of pulse responses are processed as a group of operands, in an algorithm such as the Discrete Fourier Transform. It is feasible to combine multipulse summation and spectral (filter formation) processing (with the uniform weight-per-pulse response required for temporal sidelobe cancellation). However, uniform weighting results in relatively large sidelobes in the spectral domain. This invention disclosure describes a technique that will allow group-complementary-type processing for temporal sidelobe cancellation and still permit weighting of the pulse responses to reduce or minimize frequency domain sidelobes. The technique, then, allows optimization in both dimensions of the receiver ambiguity response. Whenever weighting is applied to control spectral sidelobes, some mismatch loss occurs as an unavoidable penalty. Further, this loss appears to increase slightly whenever the temporal sidelobe control is accommodated. The cost of this optimization is in the filter mismatch loss that will, in general, be present because of weighting applied to individual pulse responses.

DESCRIPTION OF THE BEST MODE AND PREFERRED EMBODIMENT

A review of the analysis background is presented to provide insight into the properties of a reference code structure and its application in a receiver range-correlator design.

The particular reference code structure which is utilized in this invention is called a group-complementary code set. This set is derived from maximal-length codes and is a special-case solution of the generalized problem described below.

The analysis which led to the identification of group-complementary code sets began with the investigation of a correlation receiver in which the reference code is not necessarily identical to the transmitted/received pulse encoding waveform. Also, it is assumed that the received pulses can be correlated and processed in groups as shown in FIG. 1.

Figure 1:
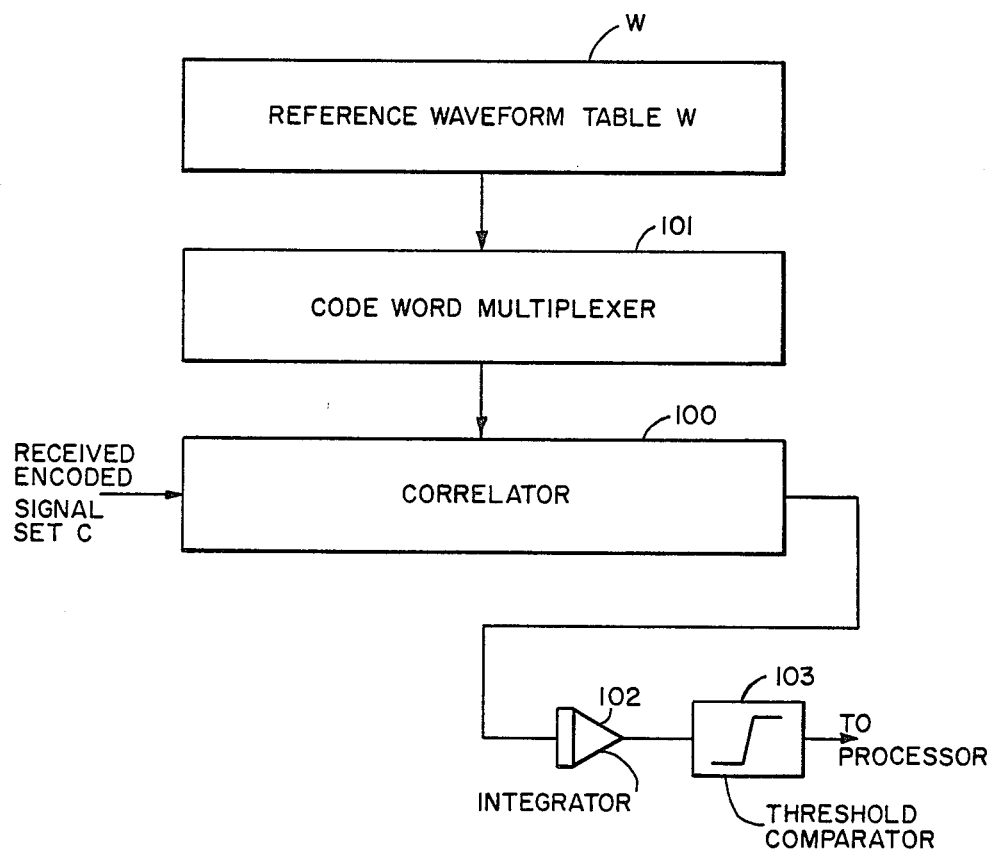
FIG. 1 is a block diagram illustrating multi-word correlation processor.

In FIG. 1, there are K different N-bit received codes (the code set c). Each of the received waveforms is correlated in correlator 100 with one of K reference waveforms in the reference set W by way of code word multiplexer 101. It is then integrated by integrator 102 and its value is compared by threshold compartor 103 before being sent to the processor (not shown).

For example, if $N=3$ and $K=2$, the code words are

| | |
|---|---|
| $c_{1,1}\ c_{1,2}\ c_{1,3}$: | Code Word No. 1 |
| $c_{2,1}\ c_{2,2}\ c_{2,3}$: | Code Word No. 2 | and the reference waveform set is

| | |
|---|---|
| $w_{1,1}\ w_{1,2}\ w_{1,3}$: | Reference Code Word No. 1 |
| $w_{2,1}\ w_{2,2}\ w_{2,3}$: | Reference Code Word No. 2. |

The range sidelobes, resulting when the encoded pulses are processed in pairs, are as follows:

| Shift | Response |
|---|---|
| 2 | $c_{1,3}w_{1,1} + c_{2,3}w_{2,1}$ |
| 1 | $c_{1,2}w_{1,1} + c_{1,3}w_{1,2} + c_{2,2}w_{2,1} + c_{2,3}w_{2,2}$ |
| 0 | $c_{1,1}w_{1,1} + c_{1,2}w_{1,2} + c_{1,3}w_{1,3} + c_{2,1}w_{2,1} + c_{2,2}w_{2,2} + c_{2,3}w_{2,3}$ |
| $-1$ | $c_{1,1}w_{1,2} + c_{1,2}w_{1,3} + c_{2,1}w_{2,2} + c_{2,2}w_{2,3}$ |
| $-2$ | $c_{1,1}w_{1,3} + c_{2,1}w_{2,3}$ |

The problem addressed can be stated as follows. For a transmitted code set, what reference waveform set will cause zero range sidelobes and minimum mismatch loss? The mixmatch loss is that loss which results from the possible nonmatched nature of the set of weights w and code words c. This loss can be expressed as $$L_w = \frac{\left[\sum_{j=1}^{K}\sum_{i=1}^{N} c_{j,i} w_{j,i}\right]^2}{KN \sum_{j=1}^{K}\sum_{i=1}^{N} w_{j,i}^2} \quad (1)$$

A constraint will be imposed on c and w such that $$\sum_{j=1}^{K}\sum_{i=1}^{N} c_{j,i} w_{j,i} = KN, \quad (2)$$

and the mismatch loss is then $$L_w = \frac{KN}{\sum_{j=1}^{K}\sum_{i=1}^{N} w_{j,i}^2} \quad (3)$$

The set of $2N-1$ range sidelobes is $$\{g_p\}: p=1,\ldots 2N-1, p\neq N, \quad (4)$$

and the main correlation lobe is $$\sum_{j=1}^{K}\sum_{i=1}^{N} c_{j,i}w_{j,i} = KN \quad (5)$$

The problem can then be stated: for a given code set (c), find the reference weight set (w) which minimizes the mismatch loss and produces zero range sidelobes. Or, in other words, find the extremum of $$L_w = \frac{KN}{\sum_{j=1}^{K}\sum_{i=1}^{N} w_{j,i}^2} \quad (6)$$

under the 2N total constraints, which require (2N−2) sidelobes of zero value defined by $$g_p = 0, p = 1,\ldots 2N-1, p\neq N, \quad (7)$$

and a mainlobe value of KN defined for p=N by $$g_N = \sum_{j=1}^{K}\sum_{i=1}^{N} c_{j,i}w_{j,i} - KN = 0. \quad (8)$$

Without loss of generality, the function to be maximized can be expressed as $$f = \frac{KN}{L_w} \sum_{j=1}^{K}\sum_{i=1}^{N} w_{j,i}^2 \quad (9)$$

A technique for finding the solution of this system is the Lagrange method of multipliers. To use this method, a new function is formed, $$F = f + \sum_{p=1}^{2N-1} \lambda_p g_p \quad (10)$$

where F is a function of KN reference variables (w) and 2N−1 multiplier variables (λ). KN+2N−1 equations can be formed from $$\frac{\partial F}{\partial w_{j,i}} = 0, j = 1,\ldots k, i = 1\ldots N \quad (11)$$

and $$\frac{\partial F}{\partial \lambda_p} = 0, p = 1\ldots 2N-1. \quad (12)$$

These simultaneous equations can be solved for the set of reference weights (w) and the multiplier set (λ).

The matrix that must be inverted in order to solve these equations has a characteristic structure useful in solving equations involving code sets with a large number of elements. This may be illustrated by the following example. For K=2 and N=2, the transmitted code set and the reference code set are $$c_{1,1}\ c_{1,2}$$
$$c_{2,1}\ c_{2,2}$$
and
$$w_{1,1}\ w_{1,2}$$
$$w_{2,1}\ w_{2,2}$$

From the lagrange method and Equation (10), $$F = w_{1,1} + w_{1,2} + w_{2,1} + w_{2,2} + \lambda_1 g_1 + \lambda_2 g_2 + \lambda_3 g_3 \quad (13)$$

where $$g_1 = c_{1,2}w_{1,1} + c_{2,2}w_{2,1} \quad (14)$$

$$g_2 = c_{1,1}w_{1,1} + c_{1,2}w_{1,2} + c_{2,1}w_{2,1} + c_{2,2}w_{2,2} - 4 \quad (15)$$

and $$g_3 = c_{1,1}w_{1,2} + c_{2,1}w_{2,2} \quad (16)$$

Forming the set of simultaneous equations, $$\frac{\partial F}{\partial w_{1,1}} = 2w_{1,1} + \lambda_1 c_{1,2} + \lambda_2 c_{1,1} = 0 \quad (17)$$

$$\frac{\partial F}{\partial w_{2,1}} = 2w_{2,1} + \lambda_1 c_{2,2} + \lambda_2 c_{2,1} = 0 \quad (18)$$

$$\frac{\partial F}{\partial w_{1,2}} = 2w_{1,2} + \lambda_2 c_{1,2} + \lambda_3 c_{1,1} = 0 \quad (19)$$

$$\frac{\partial F}{\partial w_{2,2}} = 2w_{2,2} + \lambda_2 c_{2,2} + \lambda_3 c_{2,1} = 0 \quad (20)$$

$$\frac{\partial F}{\partial \lambda_1} = c_{1,2}w_{1,1} + c_{2,2}w_{2,1} = 0 \quad (21)$$

$$\frac{\partial F}{\partial \lambda_2} = c_{1,1}w_{1,1} + c_{1,2}w_{1,2} + c_{2,1}w_{2,1} + c_{2,2}w_{2,2} - 4 = 0 \quad (22)$$

$$\frac{\partial F}{\partial \lambda_3} = c_{1,1}w_{1,2} + c_{2,1}w_{2,2} = 0. \quad (23)$$

The matrix equation for these simultaneous equations is $$A*X = Y$$

where $$X = \begin{bmatrix} w_{1,1} \\ w_{2,1} \\ w_{1,2} \\ w_{2,2} \\ \lambda_1 \\ \lambda_2 \\ \lambda_3 \end{bmatrix}, Y = \begin{bmatrix} 0 \\ 0 \\ 0 \\ 0 \\ 0 \\ 4 \\ 0 \end{bmatrix} \quad (25)$$

and $$A = \begin{bmatrix} 2 & 0 & 0 & 0 & c_{1,2} & c_{1,1} & 0 \\ 0 & 2 & 0 & 0 & c_{2,2} & c_{2,1} & 0 \\ 0 & 0 & 2 & 0 & 0 & c_{1,2} & c_{1,1} \\ 0 & 0 & 0 & 2 & 0 & c_{2,2} & c_{2,1} \\ c_{1,2} & c_{2,2} & 0 & 0 & 0 & 0 & 0 \\ c_{1,1} & c_{2,1} & c_{1,2} & c_{2,2} & 0 & 0 & 0 \\ 0 & 0 & c_{1,1} & c_{2,1} & 0 & 0 & 0 \end{bmatrix} \quad (26)$$

Several inductive observations can be made from the A matrix that are useful in synthesis of corresponding matrices for larger code groups.
1. The diagonal elements of the first KN rows/columns are equal to two; the remaining diagonal elements are equal to zero.
2. The matrix is symmetrical, square, and contains KN+2N−1 rows and columns.
3. The last (2N−1) columns of the last (2N−1) rows have zero elements.

4. The first KN columns of the first KN rows form a submatrix which is a diagonal matrix.
5. The nonzero elements not on the diagonal are composed of elements from the code set and are predictable as follows:
   a. Form a new matrix from the code set matrix (c) by reversing the order of the columns.
   b. Place the new matrix in the A matrix starting at row 1, column KN+1.
   c. Repeat step (b) (N−1) times, adding K to the starting row and 1 to the starting column for each repetition.
   d. For each nonzero element at location row i, column j, above the diagonal, place the same element at row j, column i. As an example, a solution for the case $$c = \begin{bmatrix} -1 & 1 \\ -1 & -1 \end{bmatrix} \tag{27}$$

is $$w = \begin{bmatrix} -1 & 1 \\ -1 & -1 \end{bmatrix} \tag{28}$$

and the system has zero range sidelobes and correlation function: 0,4,0.

It can be shown that the number of simultaneous equations that must be solved to find the optimum reference waveform for a set of K N-bit transmitter code words is

KN+2N−1.

It should be noted that reference waveforms that result from the system of equations will not necessarily be binary, even if the transmitted code sets are.

Certain pairs of code words, with identical pairs of reference codes, not only are matched in the sense of minimized mismatch loss but also have the property of complete cancellation of range sidelobes. These code words, called complementary sequences, are known to exist for code lengths:

$$L = 2^n \text{ for any } n \tag{29}$$

and $$L = 10*2^n \text{ for any } n \tag{30}$$

For example, the code words $\{C_1\}: -1,1,1,-1,1,-1,1,1,1,-1$ and $\{C_2\}: -1,1,1,1,1,1,1,-1,-1,1$ are complementary. Likewise, the following pairs of code words are complementary:

$\{C_1\}: 1,-1,1,1$ $\{C_2\}: 1,-1,-1,-1$ and $\{C_1\}: -1,1$ $\{C_2\}: -1,-1.$

The extension of a pair of complementary codes to a pair twice the length of the first pair can be illustrated as follows. If the first pair is given as $$\begin{pmatrix} a_0 \, a_1 \\ b_0 \, b_1 \end{pmatrix},$$

then two possible extensions have been identified by others as:

$$\begin{pmatrix} a_0 \, a_1 & b_0 & b_1 \\ a_0 \, a_1 & -b_0 & -b_1 \end{pmatrix} \quad \text{Case 1}$$

$$\begin{pmatrix} a_0 & b_0 \, a_1 & b_1 \\ a_0 & -b_0 \, a_1 & -b_1 \end{pmatrix} \quad \text{Case 2}$$

That both cases have complementary pairs can be shown by evaluating the sidelobes of each. For the length-2 sequences, it is, therefore, necessary that $$a_0 a_1 + b_0 b_1 = 0 \tag{31}$$

For the length-4 sequence of Case 1, the necessary conditions for the codes to be complementary are $$a_0 b_1 - a_0 b_1 = 0 \tag{32}$$

$$a_0 b_0 - a_0 b_0 + a_1 b_1 - a_1 b_1 = 0 \tag{33}$$

$$2(a_0 a_1 + b_0 b_1) + a_1(b_0 - b_0) = 0, \tag{34}$$

which are the general equations for the sidelobes which must be zero when these conditions are all true.

For the length-4 sequence of Case 2, the necessary conditions for the codes to be complementary are $$a_0 b_1 - a_0 b_1 = 0 \tag{35}$$

$$2(a_0 a_1 + b_0 b_1) = 0 \tag{36}$$

$$(a_0 + a_1)(b_0 - b_0) + a_1(b_1 - b_1) = 0 \tag{37}$$

and these conditions are also all true for zero sidelobes.

The technique described above can extend a given length 2 or length 10 code to lengths $2^n$ and $10*2^n$, correspondingly, for any n. Complementary codes obviously have attractive features as radar pulse-compression codes; they are available only in certain word sizes including the list of word sizes shown as follows:

| Complementary Code Word Length |
| --- |
| 2 |
| 4 |
| 8 |
| 10 |
| 16 |
| 20 |
| 26 |
| 32 |
| 40 |
| 52 |
| 64 |
| 80 |
| 104 |
| 128 |

| -continued |
| --- |
| Complementary Code Word Length |
| 160 |
| 208 |
| 256 |
| 320 |
| 416 |
| 512 |
| 640 |
| . |
| . |

Complementary pairs of sequences were discovered by Golay, using algebraic and combinational techniques. However, analysis associated with this disclosure has revealed that these sequences are also solutions to the Lagrange method of multiplier approach to finding optimum pulse compression waveforms. The co-pending invention disclosure, "Group-Complementary Code Sets for Implementing Pulse Compression Processing with Optimum Aperiodic Autocorrelation and Optimized Cross-Correlation Properties," described group-complementary code sets which are extensions of Golay's complementary pair codes to a K row by N bit matrix format. In the next section, a modified form of group-complementary code sets will be developed to permit waveform design for both temporal and spectral sidelobe control.

Figure 2:
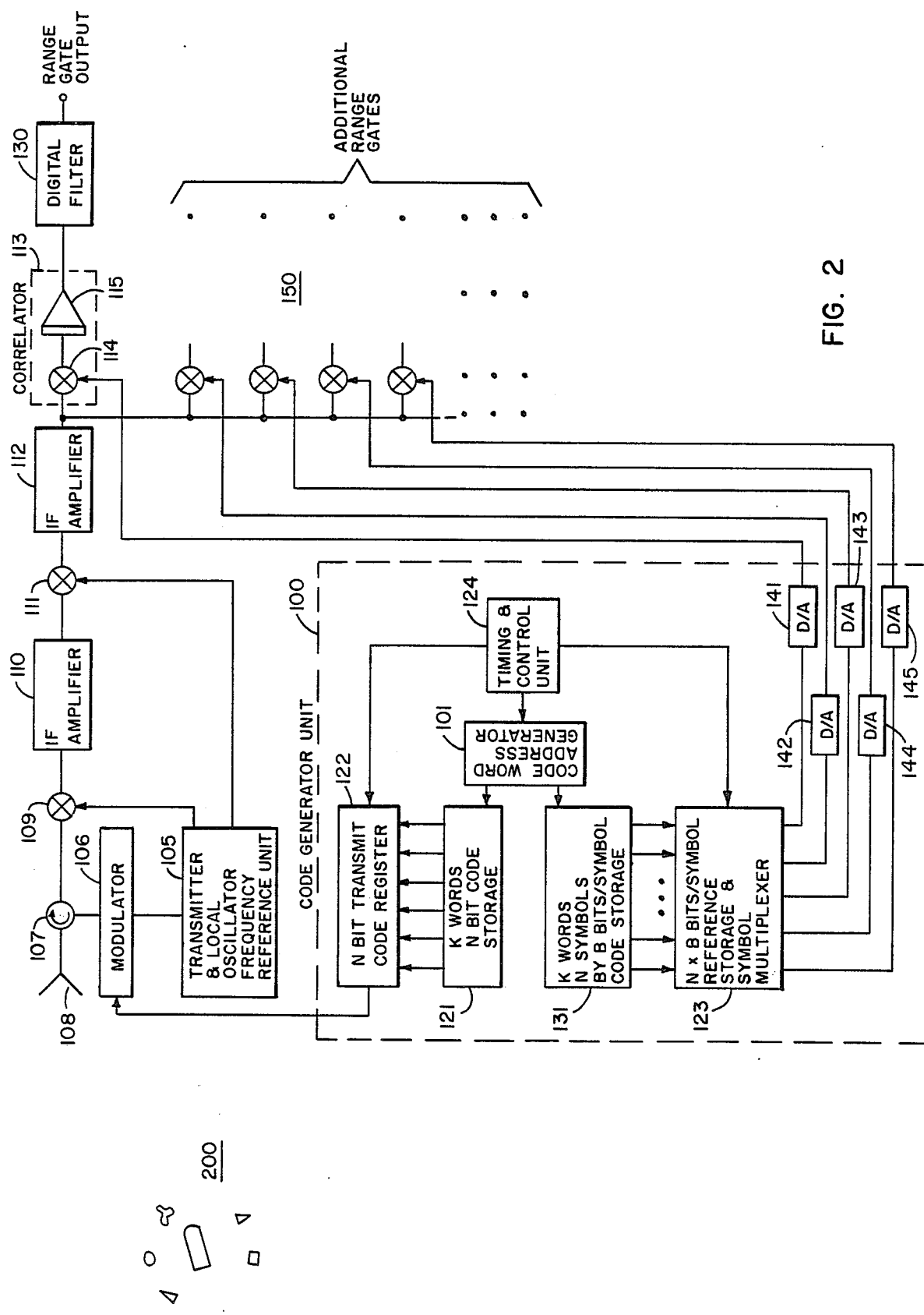
FIG. 2 is a block diagram illustrating the implementation of the present invention.

Group complementary codes may be implemented in hardware in a number of ways. One particular implementation is shown in FIG. 2. A radar seeker is represented in the diagram. Here, K pulses are generated by generator 100 and transmitted at a given pulse repetition rate (PRF—pulse repetition frequency). Each pulse is encoded with N bits of bi-phase modulation by modulator 106. After transit delay out to the RF reflector of interest 200, the received signal is cross-correlated with an appropriately delayed reference code. K pulses are added to form this range gate output. This process effectively accomplishes range gating, and the desired number of range gates are formed by a corresponding number correlators.

The RF pulses to be transmitted are generated in the Transmitter/Local Oscillator Frequency Reference Unit 105. Each pulse is encoded using bi-phase modulation, and this is accomplished in Modulator 106 where the phase during the RF pulse is changed by 180 degrees or not changed according to the base and video code word. The code word is developed in the Code Generator Unit 100 and it is composed of N bits of a digital word which controls the phase changes according to the bit pattern. The code word is commensurate with the RF pulse in time of occurrence and duration.

The encoded RF pulses are routed to the circulator 107 which in turn directs the RF energy to the antenna 108. The radiated pulses are received by the antenna upon reflection from objects 200 in the antenna field of view. The received pulses are routed through the circulator to the first mixer 109. Here the received signals are translated in frequency to the first Intermediate Frequency (IF) amplifier's (110) center frequency for amplification and filtering. Output of this unit is routed to the second mixer 111 for further translation and amplification at the second IF frequency. The output of the second IF amplifier 112 becomes one of the two input signals which the correlator 113 operates upon. The second input signal to the correlator 113 is a base band code word derived in the Code Generator Unit 100. A digital filter 130 follows the correlator and forms K filters for the range gate output. It integrates each of the K received pulses which were mixed with a corresponding reference function, producing the range gate output with minimal sidelobes in time and frequency. The correlators are each composed of a mixer 114 and an integrator 115 to carry out the cross-correlation function between the received code word and the reference code word. The reference code word is not a delayed version of the transmitted code word, but is a unique pulse with amplitude weighting corresponding to the transmitted word within the group code. The amplitude weighting accommodates sidelobe control in both range and doppler. That is, when determining the reference code words (non-binary), amplitude weighting of specified value (Taylor, etc.) was taken into account for spectral sidelobe control while maintaining zero time sidelobes. The reference delay corresponds to the range of interest for a given range gate. Additional range gates 150 are formed with additional correlators and different delayed reference code words. The range gate is formed by summing the output of the correlator for each of K pulses that are received. This summation is accomplished by the integrator of the digital filter 130 and its output becomes the range gate output.

The Code Generator Unit 100 develops the code words to be transmitted. K unique code words are transmitted before the sequence is repeated. Each correlator requires a reference code word of appropriate delay for each transmitted code word. The reference code words are also developed in the Code Generator Unit. The code words are stored in the Code Storage Units 121 and 131, both being a ROM (Read Only Memory). Each transmitted code word is N bits in length and at the appropriate time is transferred to the Transmit Code Register 122. This is accomplished by the Timing and Control Unit 124 which drives the code word address generator 101. Each code word is stored at a unique address in the ROM and as each word is addressed it is transferred to the parallel-in, serial out code register for transmission. Each transmit word is shifted out of the register in serial form to encode the RF pulse while a similar word of N symbols, B bits per symbol, is shifted to the Reference Storage and Symbol Multiplexer 123. Here, each set of N bits for each symbol is applied to the Digital to Analog (D/A) converters 141–145 in time sequence to form the reference pulse at the appropriate delay time corresponding to (1) the range delay of interest and (2) a given transmitted word. The timing and control unit 124 generates timing signals to accomplish this for each correlator. That is, for correlators corresponding to farther ranges of interest, the timing and control units shifts the same N bit symbols to the next D/A and correlator of interest in the same time sequence as before. This reference function process is repeated for all other correlators.

As each new word is transmitted, a corresponding set of N bit symbols is used in the reference and multiplexed to the D/As forming the correct reference pulse for each correlator. The correlator 113 mixes a received word with an appropriate reference pulse and integrates over time equal to the transmitted pulse. This output forms one of K samples (for K transmitted words) as input to the digital filter 130 which in turn forms K filter bins. This process occurs in each correlator and corresponding digital filter for all range gates. The whole process then repeats after all K words in the set are transmitted.

We claim:

1. A radar system comprising a code generating unit in which a sequence of a plurality of different sets of multiple bit group complementary stored code words are transmitted and reflected off a target of interest producing a return signal; a receiver for detecting the return signal; a plurality of correlators each being connected to said receiver so as to be fed the return signal and connected to the generating unit so as to be fed a different code word from the stored code words, whereby the received signal is correlated with each individual code word; a plurality of range gate outputs connected to each correlator wherein only that range gate output will be present in which a code word of the return signal and a code word on the correlator are compatible; and compatible range gate outputs sequentially occurring in accordance with the sequence of the changing code word coming from the return signal.

2. A system as set forth in claim 1 wherein said generating unit contains a second set of stored code words containing weighted code words corresponding with the original set of code words so as to take in account spectral sidelobe control while maintaining zero times sidelobes; and feeding the second set of code words to said correlators.

3. A system as set forth in claim 2 wherein correlators each have multiplexers; and as each new word is received, the corresponding code word is correlated with its amplitude weighting.

4. A system as set forth in claim 3 wherein the second set of stored code words in said generating unit are pulse words with amplitude weighting corresponding to the transmitted word within the original group code words wherein amplitude weighting accommodates sidelobe control in both range and doppler.

* * * * *